June 19, 1973  H. HEINZER  3,740,300
DEVICE FOR CONNECTING PARALLEL BANDS OR OPPOSITELY
DISPOSED WALL PORTIONS OF A TUBE BY
TRANSVERSE WELDING SEAMS
Filed June 3, 1971                              5 Sheets-Sheet 1
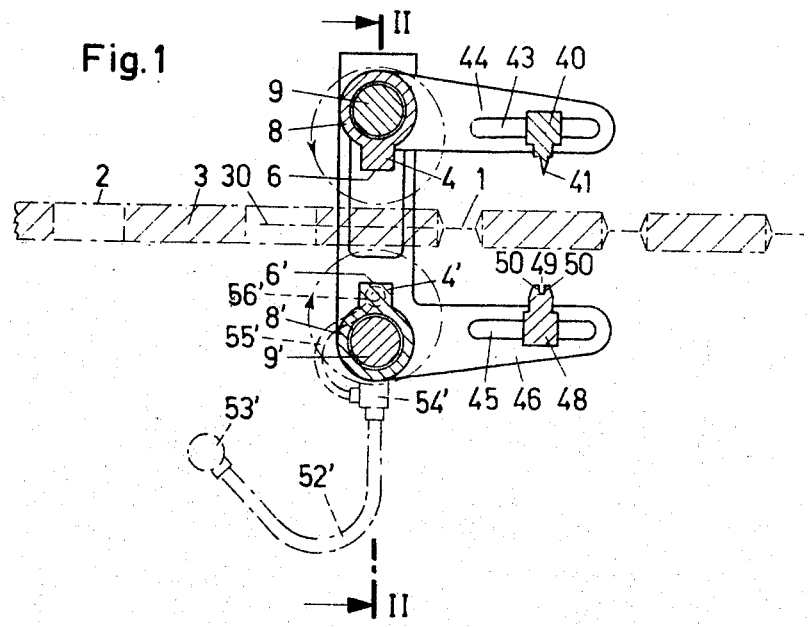
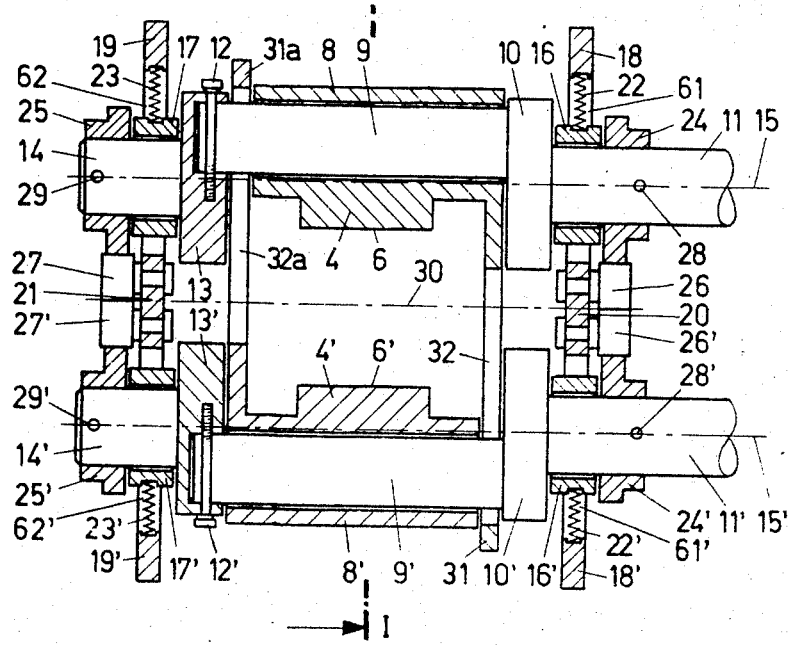

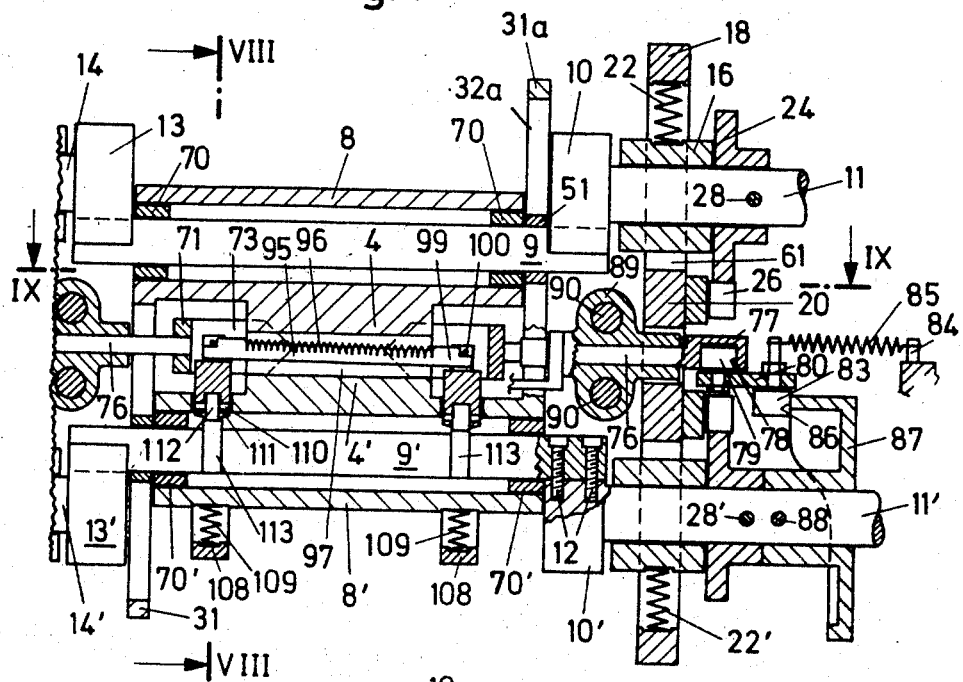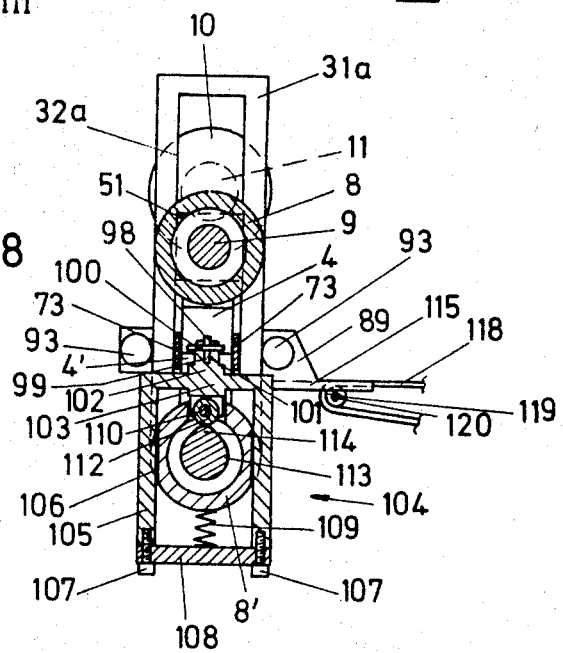

United States Patent Office 3,740,300
Patented June 19, 1973

3,740,300
DEVICE FOR CONNECTING PARALLEL BANDS OR OPPOSITELY DISPOSED WALL PORTIONS OF A TUBE BY TRANSVERSE WELDING SEAMS
Hans Heinzer, Beringen, Switzerland, assignor to Schweizerische Industrie Gesellschaft, Neuhausen am Rheinfall, Switzerland
Filed June 3, 1971, Ser. No. 149,659
Claims priority, application Switzerland, June 8, 1970, 8,584/70
Int. Cl. B30b 15/34; B32b 31/00
U.S. Cl. 156—583   9 Claims

ABSTRACT OF THE DISCLOSURE

The invention relates to article packaging machines and particularly to a device for connecting the oppositely disposed walls of a flexible tube containing articles in spaced relation by transverse welding seams produced by continuously moving welding dies between each two articles in the tube. The oppositely disposed welding dies are moved toward one another for pressing the opposite walls of the tube together by two spaced parallel crank shafts on the crank pins of which are arranged hubs to which the welding dies are fixedly attached. The welding dies are positively guided to perform vertical movements toward and away from the tube and have flat welding surfaces engaging the tube over a definite area to form a strip-like welding seam. At least one of the parallel crank shafts is adjustable to vary the transverse distance between the same, and the welding dies are so controlled that in addition to their movement toward and away from each other they perform also a translatory circular movement in vertical planes so that when the welding dies engage the tube they move with the same lengthwise a definite distance.

The invention relates to a device for connecting parallel bands or oppositely disposed wall portions of a flexible tube by transverse welding seams produced by two oppositely arranged continuously movable welding dies which in uniform intervals press the parallel bands or the oppositely disposed wall portions of the tube one upon the other. Such a device may be employed for continuously producing packages, for instance, such as are disclosed in the Swiss patent specification 374,587. In this known packaging machine two oppositely driven circular sector-shaped welding dies are employed which produce the transverse welding seams in a tube serving as packaging material. When these known welding dies press the oppositely disposed wall portions of the tube upon each other, they produce aside from the deformation of the flexible packaging material, solely a line engagement between these wall portions in that the dies roll upon the tube. It was discovered that the time period of this pressing operation and the necessary heat transfer to the material of the tube to be welded, or when using certain materials for the tube, particularly relatively thick tubes, is not sufficient.

The object of the present invention is a device which produces improved welding seams for which purpose the device of the present invention is provided with hubs which are arranged on the crank pins of two oppositely driven parallel crank shafts and which are guided in vertical planes to perform oppositely directed translatory circular movements; whereby the two crank shafts are mounted relatively movable with respect to one another; and that means are provided which periodically change the transverse distance of the parallel crank shafts from each other in such a manner that the two welding dies over a limited angle of rotation of the crank shafts are pressed together over a definite area and also come in operating engagement with the material to be welded over a definite area.

The invention will now be explained in greater detail with reference to the accompanying drawings which by way of example illustrate diagrammatically a few embodiments of the device of the invention.

In the drawings:

FIG. 1 illustrates a vertical section along the line I—I of FIG. 2 of a first embodiment of the device of the invention, but certain details have been omitted for the sake of clearness;

FIG. 2 illustrates a vertical section along the line II—II of FIG. 1;

FIG. 7 illustrates a sectional view similar to FIG. 2 of a third embodiment of the invention;

FIG. 8 illustrates a sectional view along the line VIII—VIII of FIG. 7; and

Figure 3:
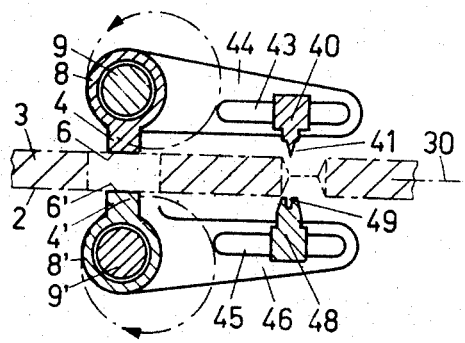
FIGS. 3 and 4 illustrate each a different operating phase of the device of the invention in a sectional view similar to FIG. 1.

The welding device illustrated in the FIGS. 1 and 2 is employed for producing of transverse welding seams 1 for connecting oppositely disposed wall portions of a continuously axially forwardly moving tube 2 made of a weldable plastic. This tube 2 contains articles 3 which are uniformly spaced from each other in the tube. The articles may consist, for instance, each of a number of stacked biscuits. The articles 3 are to be packed in the tube material and this requires the formation of the transverse welding seams 1 disposed in the empty intervals between the articles 3. After this welding operation follows a cutting of the tube 2 within the range of the seams 1. In what manner the tube is made from a foil of plastic or from paper provided with a coating of thermo-plastic weldable material and is supplied with the articles to be packed is, for instance, disclosed in the already mentioned Swiss patent specification 374,587. This known packaging device is provided for the production of spaced welding seams with two oppositely rotating segment-shaped heated rollers provided with dies. These dies, as already indicated, engage each other theoretically along a transverse line when the tube is squeezed together and this engagement takes place for only a very short time period. It is, however, of interest —in order to produce a good welding seam—to provide a longer contact period and also a relatively wide transverse strip. In order to obtain such an improved operation, the device of the present invention comprises two superimposed welding dies 4 and 4' provided with flat rectangular welding surfaces 6 and 6' which face each other, whereby the dies in the position of FIG. 4 squeeze the tube 2 together and by means of the effect of heat weld the two wall portions of the tube which engage each other together.

The welding dies 4 and 4' are so guided that their welding surfaces 6 and 6' periodically approach each other and move away from each other, and while doing this remain always parallel to one another. For this purpose the upper welding die 4 is provided with a hub 8 which is mounted on a crank pin 9 which according to FIG. 2 is connected by a crank disk 10 fixedly with a driven crank shaft 11. The free end of the crank pin 9 is connected by a screw 12 with a second crank disk 13 which is disposed on a stub shaft 14 which latter comprises an extension of the crank shaft 11 whose geometric axis is designated by 15.

The extended crank shaft 11, 14 is supported in two bearings 16 and 17 which are supported at the upper ends 18 and 19 of stationary frame legs 20 and 21 by means of pressure springs 22, 23. The pressure springs 22, 23 are disposed in slots 61 and 62 serving as a vertical guide of the bearings 16 and 17 in the frame legs 20 and 21. From below the exetnded crank shaft 11, 14 is supported by means of two cams 24, 25 on two rollers 26 and 27 carried by the center portion of the stationary frame legs 20 and 21. The cams 24 and 25 are attached to the extended crank shaft 11, 14 by pins 28 and 29. The hub 8' of the lower welding die 4' is mounted in similar manner as the hub 8 of the upper welding die 4, but mirror symmetrically with respect to the same and the horizontal center plane 30. There are also provided other lower parts arranged with similar arranged numerals provided with a prime (') and therefore a repetition of the description of these details at this time does not appear to necessary.

The hub 8 is provided at the right end of FIG. 2 with a downwardly directed radial arm 31 which is provided with a longitudinal slot 32 intno which engages the right-hand end of the crank pin 9'. Reversely, the hub 8' is provided at its left-hand end with an upwardly directed radial arm 31a which has a longitudinal slot 32a into which engages the left-hand end of the crank pin 9. As a result, the crank pins 9 and 9' in each of their positions by means of the radial guide arms 31a and 31, respectively, pivotally guide the oppositely disposed hubs 8 and 8', respectively, so that the rectangular welding faces 6 and 6' are always parallel to one another.

If the bearings 16, 17 and 16', 17' were stationary, the welding surfaces 6 and 6' could compress the tube 2 only for a very short time, namely only in that position in which the oppositely disposed crank pins 9 and 9' have the smallest distance from each other when the cranks 11 and 11' are driven in opposite directions. However, owing to the yieldable support of these bearings 16, 17 and 16', 17' in an upward or downward direction and owing to the shape of the cams 24, 25 and 24', 25', which engage the rolls 26, 27 and 26', 27', the welding period is now substantially extended. This will be made clear with reference to FIG. 5 which shows four positions identified as $a$, $b$, $c$ and $d$ and in which figure the perimeters of the cams 24, 24' or 25, 25' and the ones of the rollers 26, 26' or 27, 27' are illustrated in solid lines, while the perimeters of the welding dies 4 and 4' with their hubs 8 and 8' are illustrated by dash-and-dotted lines.

Figure 5:
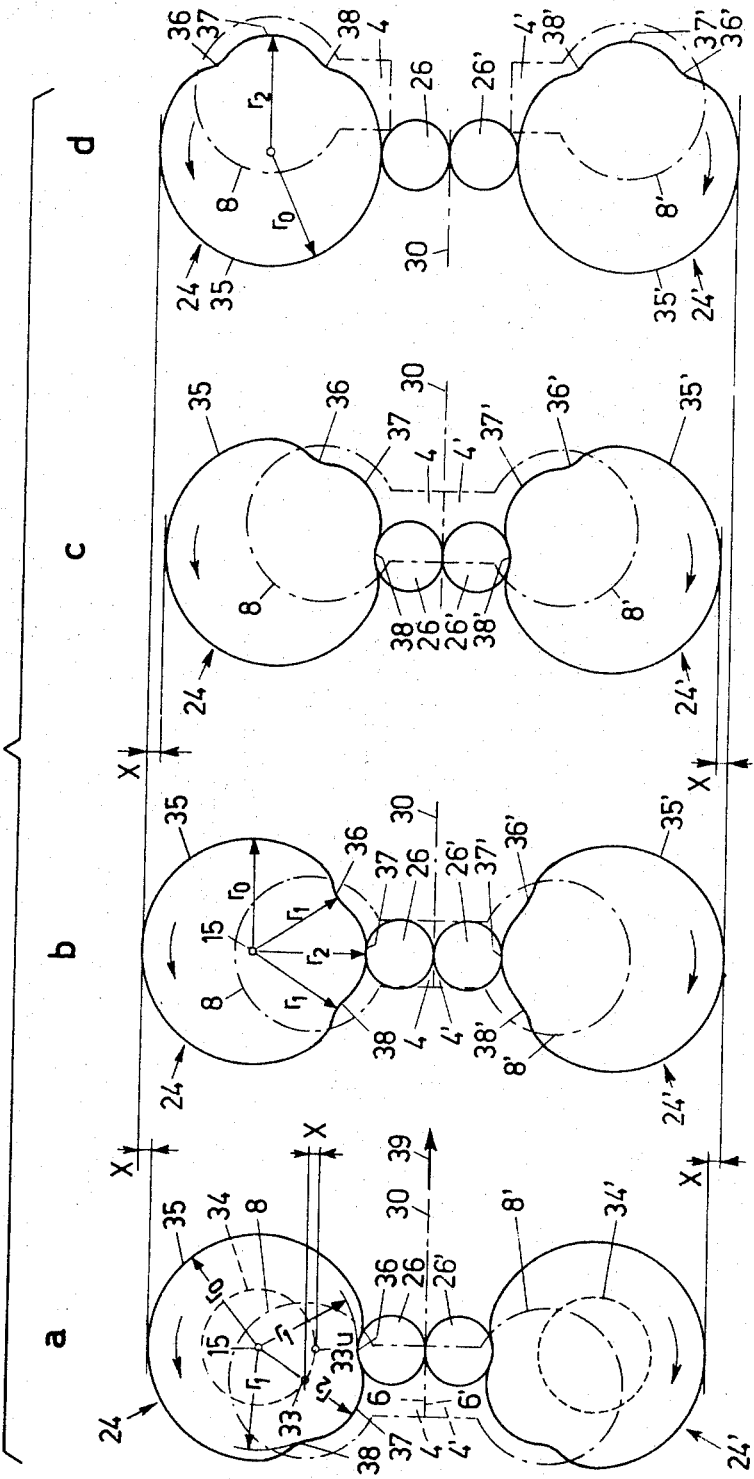
FIG. 5 illustrates four different positions of a pair of cams supported by pairs of rollers.

The center 33 of the perimeter of the hub 8, which rotates along the circle illustrated in dash lines in FIG. 5 in the direction of the arrow, rotates about the axis 15 of the drive shaft. As illustrated in position $a$, the center 33 is disposed a distance X higher than the lowest point 33$u$, which point is being traversed by the center 33 during its movement along the illustrated circle. The radius of the cam 34 has along about one-half of the perimeter of the cam a circumferential portion 35 having a constant base value $r_0$. At the end of this circumferential portion 35 follows a depression 36 in which the radius of the cam decreases to its smallest value $r_1$. The depression 36 is followed by a bulge 37 in which the cam radius increases to a value $r_2$. Between the bulge 37 and the other end of the circumferential portion 35 is again arranged a depression 38 having the smallest value $r_1$ of the radius of the cam. Now $r_2 - r_1 = X$, i.e. the difference between the values of the cam radius at its highest point of the bulge 37 and the lowest points of the depressions 36 and 38 is equal to the above mentioned distance X between the points 33 and 33$u$. Furthermore, the radius of curvature at the deepest point of the depressions 36 and 38 is larger than the radius of the roll 26.

During the rotation of the crank shaft 11 the circumference of the cam 24 is urged by the spring 22 against the circumference of the roller 26 and the circumferential portion 35 which engages this roller 26 remains in engagement with the roller 26 as long as the welding die 4 is disposed still somewhat above its operating range.

Position $a$ illustrates the position in which the roller 26 which has entered the depression 36 is disposed in its deepest point. In this position the welding surface 6 will be located in the horizontal center plane 30 when the thickness of the tube material in accordance with the drawing, for the sake of simplicity, may be considered as negligibly small.

During the continuous rotation of the crank shaft 11 the center 33 is lowered and therewith the welding die 4 is moved also lower with respect to the axis 15 of the crank shaft 11 but the axis 15 is raised when the bulge 37 engages the roller 26, whereby both these movements compensate each other so that the welding surface remains in the center plane 30. The welding surface moves thereby in horizontal direction, namely in the direction of the arrow 39. The circumferential speed of the crank shafts 11 and 11' is influenced by the superimposition of a pulsating component in such a manner that the welding dies 4 and 4', as long as they remain in engagement with the uniformly advance tube 2, move with the same speed as the tube 2 horizontally so that the welding surface 6 also in the longitudinal direction remains immovable relative with respect to the moving tube 2.

Position $b$ illustrates the position of the pair of cams 24, 24' when the highest points of the bulges 37 and 37' engage the rollers 26 and 26'. The cams 24 and 24' are each moved a distance X away from the horizontal plane 30.

Position $c$ illustrates the same configuration when the rollers 26 and 26' engage the deepst points of the depressions 38 and 38'. During the complete rotation of the cams 24 and 24' from the position illustrated at $a$ in FIG. 5 to the position illustrated at $c$ in FIG. 5, the welding surfaces 6 and 6' remain in the center plane 30; that is, the tube 2 during a time interval of considerable length was pressed together by this movement of the welding dies 4 and 4' which engage the tube over definite areas and at the same time cause the welding area to be heated.

Position $d$ illustrates a position in which one point of the circumferential portion 35 engages the roller 26. Compared with the positions $a$ and $c$, the cam 24 has been lifted about the same distance as shown in position $b$. This means that in the present case $r_0$ has been selected to equal $r_2$; however, it would also have been possible to select $r_0$ to be greater than $r_2$.

Figure 4:
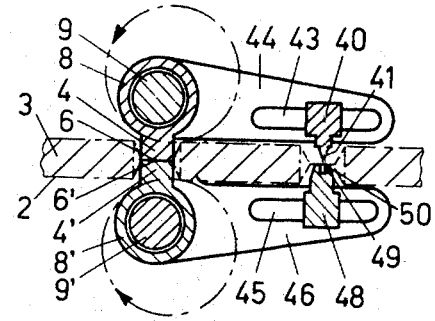

In order to separate the packaged articles 3 from each other after the welding seam 1 has been produced, the welding device is provided with a knife 40 whose cutting edge 41 extends transversely over the path of movement of the tube 2. The knife 40 is secured with both its end in two horizontal slots 43 of two horizontal arms 44 attached to the hub 8 of the upper welding die 4, so that the distance of the knife 40 from the hub 8 may be adjusted according to the length of the articles 3. The hub 8' of the lower welding die 4' is also provided with two horizontal arms 46 each having therein a longitudinal slot 45 in which a counter blade 48 for the knife 40 is adjustably secured. The counter blade 48 which is adjustable to a position below the knife 40 is provided at its upper face with a groove 49 into which the cutting edge 41 enters when the tube 2 in the range of the seam 1 is cut. It is obvious that the arms 44 and 46 and the knife 40 and the counter blade 48 perform the same movements as the hubs 8 and 8'. The counter blade 48 is so dimensioned that the upper two edges 40 of the groove 49 will be disposed in the horizontal center plane 30 and in this position supports the welding seam 1 when the lower welding die 4' produces the next welding seam in this center plane 30. In this position which is illustrated in FIG. 4, which corresponds to the cam position as illustrated in FIG. 5, the cutting edge 41 has already entered the groove 49 and has therefore cut the tube 2 within the range of the welding seam 1. The severed package is now delivered to a not-illustrated conveyor means, for instance an endless conveyor band.

While heretofore the conventional sector-shaped rotary welding dies required electric heating current which had to be supplied by brushes and slide rings, it is now possible to connect the heating resistances for the parallel guided welding dies 4 and 4', which translatorily move in a vertical plane on circular paths, by means of a flexible cable continuously with an electrical supply circuit. FIG. 1 illustrates for this purpose a suspended connecting cable 52' which conducts electricity from a stationary connecting box 53' to another box 54' attached to the hub 8. From the connecting box 54' two insulated conductors 55', which in FIG. 1 are arranged one behind the other, lead to the ends of a heating resistance 56' which is embedded in the welding die 4'. Obviously, the upper welding die 4 is provided with similar mirror-symmetrical parts.

Figure 6:
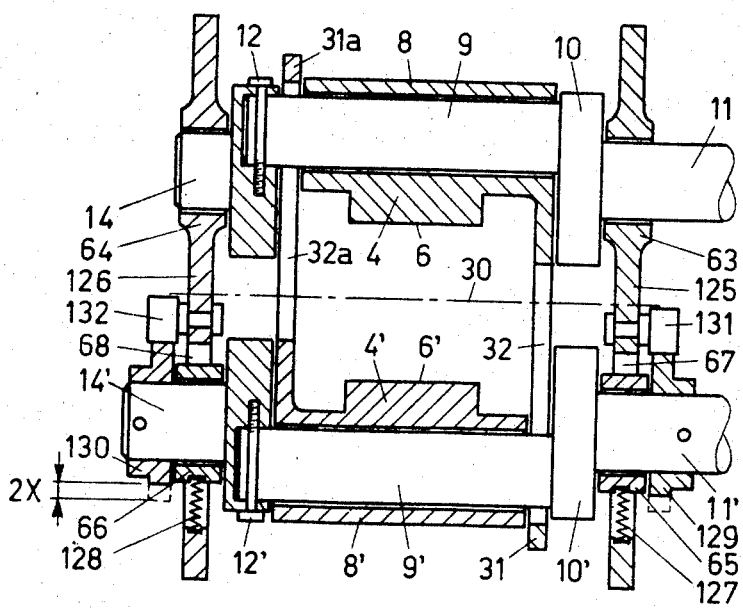
FIG. 6 illustrates a sectional view similar to FIG. 2 of another embodiment of the device in accordance with the invention.

FIG. 6 illustrates a modified embodiment of the device of the invention in which the extended crank shaft 11, 14 is mounted in stationary bearings 63 and 64. The extended crank shaft 11', 14' is however mounted in slidable bearings 65 and 66 which are guided in vertical slots 67 and 68 in two frame legs 125 and 126 and are urged by springs 127 and 128 upwardly. Cams 129 and 130 which are arranged on the crank shafts 11' and 14' and engage rollers 131 and 132 which are mounted on the frame legs 125 and 126. In this welding device the cams 129 and 133 are so designed that the maximum lift of the bearings 65 and 66 is equal to $2x$, namely is equal to the sum of $X+X$ of the maximum lifts compared with the cams 24 and 25 or 24', 25' of the first described embodiment of the welding device. Also in the embodiment of the device illustrated in FIG. 6 the welding surfaces 6 and 6' of the welding dies 4 and 4' remain an extended period of time in engagement with the compressed tube 2, whereby the welding faces 6 and 6' remain only then in the center plane 30 when the hub is equal X, namely is equal to only one-half the maximum lift. The elevated position of the welding surfaces 6 and 6' varies with respect to the center plane 30 between $+X$ and $-X$. This apparent disadvantage has, however, the advantage that the construction is somewhat simpler. A leading or a lagging of the welding surfaces 6 and 6' in the feed direction of the tube 2 during the engagement period with the tube 2 is again eliminated by a small non-uniformity in the circumferential speed of the crank.

The two above described embodiments of the device of the present invention are very suitable for packaging of relatively flat articles. If, however, the dimensions of the articles to be packed become very large in the direction of the movement of the welding dies 4 and 4', then certain difficulties may be encountered, because the walls of the tube which are pressed one upon the other by the welding dies in a direction transverse to the longitudinal direction of the tube, or transverse to the direction of movement of the tube 2 are longer than the corresponding transverse dimension of the article. During the packaging it may happen that at the ends of the package the tube material will be irregularly folded beginning from the transverse seam to that portion of the tube which surrounds the article. It is, however, desired that the packing material should also be positioned as closely as possible against the ends of the article. Furthermore, when the articles are relatively high, then there is the danger that during the packing operation the movement of the knife 40 and the counter blade 48 is made difficult by the high article.

Figure 9:
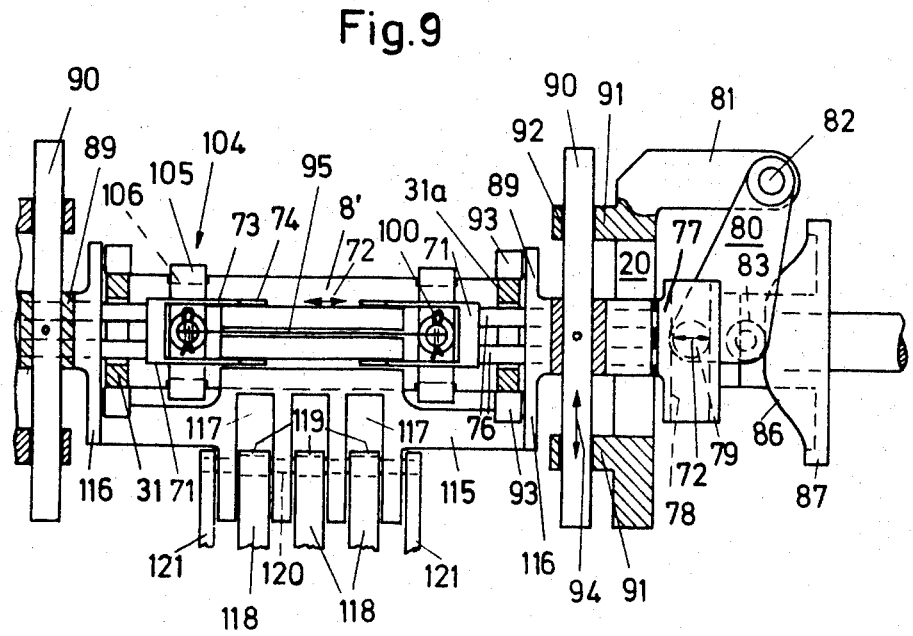
FIG. 9 illustrates a sectional view along the line IX—IX of FIG. 7.

Accordingly, the FIGS. 7, 8 and 9 disclose a third embodiment of the device of the invention in which also high articles may be cleanly packed by eliminating any difficulties in the operation of the knife.

In the FIGS. 7, 8 and 9 the same parts used also in the preceding embodiments, such as FIG. 2, are provided with the same reference numerals. Furthermore, certain parts on the left-hand side of the FIGS. 7 and 9 have been omitted because they are constructed in the same manner as the parts illustrated at the right-hand side of these figures. The welding device is again provided with two super-imposed welding dies 4 and 4' and the hub 8 of the upper welding die 4 is again mounted on a crank pin 9 which by means of the crank disk 10 is connected with the crank shaft 11 supported in the vertically movable bearings 16. In the present case there are arranged between the hubs 8, 8' and the crank pins 9, 9' the additional distance producing bearing rings 70, 70'. Without repeating a description of all the individual parts which already have been used in the description of the device illustrated in FIG. 2, it should be noted that at this time also a folding device is provided for folding the tube material prior to the formation of the transverse seam.

There is provided also an interval in the tube 2 without any article therein, namely not only between the welding dies 4 and 4' but also between two symmetrical U-shaped gusset folders 71 which are moved back and forth in the direction of the double arrow 72 (FIG. 9). The two legs of the U-shaped gusset folder 71 comprise two thin plates 73, which are disposed in planes at right angles to the tube 2 and which have a central symmetrical portion 74. When now the gusset folders are moved at the same time with the welding dies 4 and 4' against the tube 2, then the material of the tube 2 is converted into regular folds.

According to FIGS. 7 to 9 each gusset folder 71 is attached at one end of two horizontal parallel control rods 76, the other end of which are attached to a control head 77 which transmits to the rods 76 a reciprocating movement indicated by the double arrow 72. Since the welding dies 4, 4' during the welding operation—as previously explained—advance with the tube 2, it is obvious that also the gusset folders 71 have to follow this movement. For this purpose the control head 77 is provided with a groove 78 which extends parallel to the feeding direction of the tube 2. In this groove 77 engages a roller 79 which is mounted on a lever 80. This lever 80 is provided with an additional roller 83 and is pivotally connected at 82 to an arm 81 extending outwardly from the frame leg 20, as shown solely in FIG. 9. The roller 83 by means of a tension spring 85 is kept in engagement (FIG. 7) with a cam edge 86 of a cam 87. This cam 87 is attached with a pin 88 to the lower crank shaft 11'. These control rods 76 are slidably arranged in a carrier head 89 in which are mounted two parallel guide rods 90 extending parallel to the direction of movement, whereby these guide rods 90 are supported by inwardly directed projections 91 of the frame leg 20 in guides 92. The carrier head 89 is provided with two rollers 93 symmetrically arranged to the centerline of the arm 31a on the hub 8' and engage the outer surface of the same.

The crank pin 9 is again guided in a longitudinal slot 32a of the arm 31a and now is movable over a slide block 51, so that the arm 31a always remains vertical and move translatory with the hub 8' whose horizontal movement is the same as that of the hub 8. The arm 31a transmits by means of the rollers 93 to the carrier head 89 a reciprocating movement which also is transmitted to the guide rod 90 as indicated by the double arrow 94. The carrier head 89 transmits this movement by means of the operating rods 76 to the control head 77 in whose groove 78 the roller 79 is slidable. At the same time the control lever 80 is pivoted so that the roller 70 moves the control head 77 and therewith is also moved by means of the rods of gusset roller 71 in the direction of the double arrow 72.

On the left-hand side of the FIGS. 7 and 9 the respective frame leg and the parts on the same and on the exterior of the same are omitted. Nevertheless, these parts are symmetrically arranged at the one described to be at the right-hand side of these figures. Obviously, in place of the crank shafts 11 and 11' are employed the stub shafts 14 and 14', whereby the stub shaft 14' operates the cam 87 mounted on the same.

A knife 95 with a saw-tooth cutting edge 96 for cutting the tube 2 in the center of the transverse seam 9 is movable in a groove 97 (FIG. 7) of the welding die 4'. This groove 97 is disposed opposite a groove 98 arranged in the welding die 4. The offset right-hand end 99 of the knife 95 is attached outside of the welding die 4' by means of a split pin 100 in a slot 101 of an upwardly projecting extension 102 on the upper side 103 of a rectangular frame 104. Two vertical sides 105 of this frame 104 are guided in grooves 106 of the hub 8'. The lower frame side 108 is detachably attached by screws 107 to the lower ends of the vertical sides 105 and is urged downwardly by a pressure spring 109 engaged by the hub 8'. Furthermore, by means of a pin 110 a roller 112 is attached to two downwardly extending projections 111 of the upper end side 103 and is kept in engagement with the cam 113 fixedly attached to the crank pin 9'. This cam 113 has a single rather sharp projection 114. The left-hand end of the knife 95 designated by 99 is attached and mounted in the same manner as the right side end 99 so that a repetition of this part of the description is superfluorus.

The two cams 113 are advantageously displaced with respect to each other about an angle of 1 to 2° on the crank pin 9'. This results in a progressive cut in transverse direction of the tube. The same result could be obtained with the assistance of an inclined arranged knife. In such a case, however, a somewhat greater cam stroke is required.

According to FIGS. 7 and 8 the roller 112 has just engaged the projection 114. This means that the knife 95 is in its highest position and its cutting edge 96 has entered the groove 98 of the upper welding die 4, and has cut the tube 2 in the center of the transverse seam previously produced by the welding dies 4 and 4'. It is clear that with the exception of a small range of the projection 114, the roller 112 and therewith also the knife 95 will always be in the lowest position so that the knife 95 is always on the bottom of the groove 97 in the welding die and cannot interfere with the movement of the tube 2 and of the articles therewith independent of the height of the articles.

After the tube 2 has been cut in the center of the transverse seam 1 the completed package which has been separated from the tube comes to lie on a movable table plate 115 (FIG. 8) which is attached to two downwardly projecting projections 116 of the two carrier heads 89 and always moves horizontally back and forth in the direction of the double arrow 94. The table plate 115 is provided, when looking in the feed direction, with three notches into which extend the starting ends of three conveyor bands 118 which are conducted over rollers 119. All the rollers 119 are attached to a common shaft 120 which with its ends is supported in two stationary walls 121 which limit the sides of the conveyor means.

In place of the illustrated knives 95 which has a saw-tooth cutting edge one may obviously employ also a knife having a smooth cutting edge. In fact, any other type of special knives may be used which produce zig-zag-shaped cuts.

It is obvious that the described welding devices may also be used without change to connect at regular distances two or even more than two superimposed in longitudinal direction moving bands to connect the same with transverse seams. It should also be noted that the term "welding" is to be understood in its widest sense and that under certain circumstances the bands or the oppositely disposed wall parts of a tube, when provided with certain surface layers may be connected by a simple pressure by means of a so-called "cold welding." Finally, the terms "vertical" and "horizontal" as well as "upper" and "lower" as used in the present description and the claims relate solely to the devices illustrated in the drawings which show the general position of the parts. Finally the welding surfaces 6 and 6' described in the embodiments and which have plane rectangular surfaces may also have any other shape. The welding surfaces may, for instance, have the shape of roof-edge surfaces with a V-shaped profile which extend transverse to the feed direction.

What I claim is:

1. A device for welding together a pair of moving portions having surfaces of weldable material with a weld seam extending transversely to the direction of movement of the portions, comprising two welding dies, each die having a hub and a welding surface, two crank shafts each having a crank, said welding die being mounted on the cranks of said crank shafts by the hub, means for mounting said crank shafts in spaced parallel relationship, said mounting means enabling variation in the spacing between the shafts, means for rotating said crank shafts, means for varying the distance between said shafts during a given period of rotation thereof, and means for guiding the welding surfaces of the dies in a facing relationship during rotation of said shafts with the welding surface moving in oppositely directed paths having a circular and a translatory movement so that during a limited angle of rotation of the crank shafts said welding surfaces contact the moving portions to provide the weld seam.

2. A device according to claim 1, wherein said mounting means includes vertically adjustable bearings for supporting at least one of said two crank shafts to provide a movable crank shaft and wherein said means for varying include cams on the movable crank shaft, rollers mounted on a fixed axis and engaging said cams, spring means for urging said cams in engagement with said rollers, said cams having two depressions with a bulge therebetween which depressions and bulge are so dimensioned that as the rollers move from the deepest portion of one of said depressions across the bulge and thereafter engage the other depression the welding surfaces of two welding dies engage the moving portions and apply a continuous pressure thereto.

3. A device according to claim 1, wherein said means for guiding includes arms on the hubs of each welding die, said arms being provided with slots receiving the crank on which the other die is mounted.

4. A device according to claim 1, wherein said mounting means includes vertically adjustable bearings for each of said crank shafts. and wherein said means for varying includes cams on said crank shafts, rollers mounted on fixed axes and engaging said cams, said cams being symmetrically shaped, so that the crank of the two crank shafts remains the same distance apart as the welding surfaces of the welding dies press the moving portions together during formation of the weld steam.

5. A device according to claim 1, wherein said mounting means includes vertically adjustable bearings for one of said two crank shafts and two fixedly mounted bearing for the other of said two crank shafts.

6. A device according to claim 1, which includes electric heating means mounted on said welding dies, and flexible conductors for permanently connecting said heating means with a source of current.

7. A device according to claim 1, which includes carrier heads, a table plate attached to said carrier heads for receiving articles packed between the moving portions and sealed by the transverse seams to form packages, and a discharge conveyor for removing the packages from the table plate.

8. A device according to claim 1, which includes means for cutting the moving portions through the weld seam formed by the welding dies, and cutting means including each of the welding dies having a groove in the weld surface extending transversely to the direction of movement of the moving portions, cams provided on the crank of one of the two crank shafts, a frame movably mounted on crank of said one crank shaft, said frame having a roller urged by spacing means into engagement with each of said cams, a knife supported by said frame in the groove of the welding die carried by said one crank shaft, said cam being arranged on the crank to cause after formation of the weld seams the movement of said knife from the one groove through the seam into the groove of the other welding die so that the moving portions are welded together with a weld seam and then severed at said seam.

9. A device according to claim 1, in which the end of the crank shaft facing away from the crank is provided with an extension which is rotatably supported in the same manner as the crank shaft.

References Cited

UNITED STATES PATENTS

| | | | |
|---|---|---|---|
| 2,975,824 | 3/1961 | Schenkengel | 156—583 |
| 2,924,694 | 2/1960 | Kreider | 156—583 |
| 3,257,257 | 6/1966 | Karsten et al. | 156—583 |
| 3,416,988 | 12/1968 | Dryden | 156—583 |
| 3,297,504 | 1/1967 | Brown et al. | 156—580 |

NORMAN G. TORCHIN, Primary Examiner

J. L. GOODROW, Assistant Examiner

U.S. Cl. X.R.

156—580